United States Patent
Nabar et al.

(10) Patent No.: US 8,149,811 B2
(45) Date of Patent: Apr. 3, 2012

(54) WIRELESS NETWORK WITH SIMULTANEOUS UPLINK TRANSMISSION OF INDEPENDENT DATA FROM MULTIPLE CLIENT STATIONS

(75) Inventors: Rohit U. Nabar, Sunnyvale, CA (US); Hongyuan Zhang, Sunnyvale, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 859 days.

(21) Appl. No.: 12/175,501

(22) Filed: Jul. 18, 2008

(65) Prior Publication Data
US 2009/0022093 A1  Jan. 22, 2009

Related U.S. Application Data

(60) Provisional application No. 60/950,494, filed on Jul. 18, 2007, provisional application No. 61/057,644, filed on May 30, 2008.

(51) Int. Cl.
*H04J 1/00* (2006.01)
*H04L 12/413* (2006.01)

(52) U.S. Cl. .......................... 370/343; 370/445
(58) Field of Classification Search .................. None
See application file for complete search history.

(56) References Cited

U.S. PATENT DOCUMENTS

| | | | |
|---|---|---|---|
| 6,272,117 B1 * | 8/2001 | Choi et al. | 370/330 |
| 6,594,251 B1 * | 7/2003 | Raissinia et al. | 370/347 |
| 7,289,481 B2 * | 10/2007 | Wax et al. | 370/338 |
| 7,394,787 B2 * | 7/2008 | Lee | 370/331 |
| 7,636,328 B2 * | 12/2009 | Teague et al. | 370/277 |
| 7,873,049 B2 * | 1/2011 | Gaur et al. | 370/392 |
| 2001/0038619 A1 * | 11/2001 | Baker et al. | 370/335 |
| 2002/0150058 A1 | 10/2002 | Kim et al. | |
| 2005/0195786 A1 * | 9/2005 | Shpak | 370/338 |

FOREIGN PATENT DOCUMENTS

| | | |
|---|---|---|
| EP | 1 087 630 A | 3/2001 |
| JP | 06-268575 | 9/1994 |
| JP | 06 268575 A | 9/1994 |

OTHER PUBLICATIONS

Invitation to Pay Additional Fees and, where Applicable, Protest Fee dated Jan. 21, 2009 in reference to PCT/US2008/070469.
The International Search Report and the Written Opinion of the International Searching Authority, or the Declaration mailed Mar. 11, 2009 for International Application No. PCT/US2008/070469 filed Jul. 18, 2008; 15 pages.

(Continued)

*Primary Examiner* — Nittaya Juntima

(57) ABSTRACT

A wireless network including client stations and an access point. A first set of client stations transmit uplink user data during a simultaneous uplink transmission period without sensing channel prior to transmitting the uplink user data. A second set of client stations transmit the uplink user data by sensing channel prior to transmitting the uplink user data. The access point (i) services the client stations, (ii) instructs the second set of client stations to not transmit the uplink user data during the simultaneous uplink transmission period, and (iii) receives the uplink user data transmitted from two or more of the first set of client stations during the simultaneous uplink transmission period. The access point sequentially transmits respective acknowledgements to the two or more of the first set of client stations in a non-overlapping manner during the simultaneous uplink transmission period.

30 Claims, 10 Drawing Sheets

OTHER PUBLICATIONS

Second Office Action in corresponding European Patent Application No. 08 782 054.4, dated Feb. 3, 2011.

U.S. Appl. No. 12/175,526, filed Jul. 18, 2008, Rohit U. Nabar et al.

IEEE P802.11g/D8.2, Apr. 2003 (Supplement to ANSI/IEEE Std 802.11-1999(Reaff 2003)); DRAFT Supplement to STANDARD [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE 802.11n; IEEE 802.11-04/0889r6; IEEE P802.11 Wireless LANs; TGn Sync Proposal Technical Specification; Syed Aon Mujtaba; Agere Systems Inc.; May 18, 2005; 131 pages.

IEEE Std 802.11a-1999 (Supplement to IEEE Std 802.11-1999); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band; LAN/MAN Standards Committee of the IEEE Computer Society; Sep. 16, 1999; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

\* cited by examiner

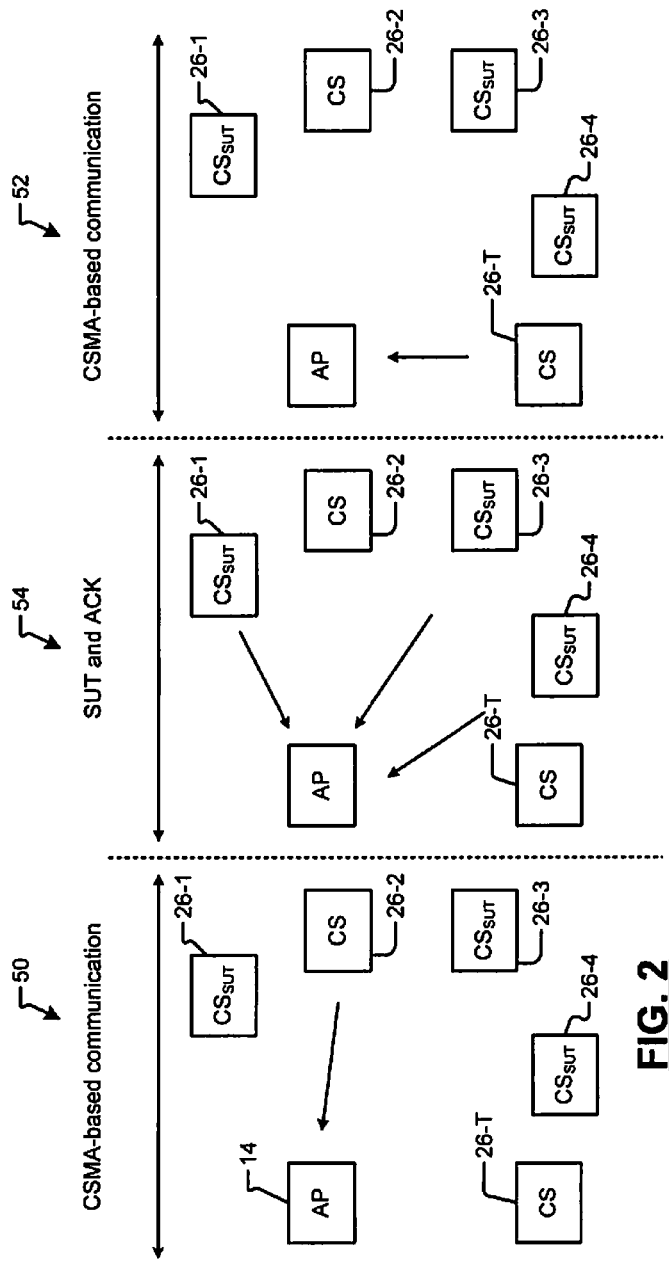
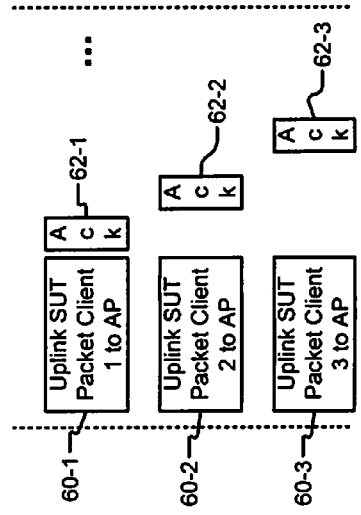
FIG. 2
FIG. 3

WIRELESS NETWORK WITH SIMULTANEOUS UPLINK TRANSMISSION OF INDEPENDENT DATA FROM MULTIPLE CLIENT STATIONS

CROSS-REFERENCE TO RELATED APPLICATIONS

This application claims the benefit of U.S. Provisional Application No. 60/950,494, filed on Jul. 18, 2007 and U.S. Provisional Application No. 61/057,644, filed on May 30, 2008. The disclosures of the above applications are incorporated herein by reference in their entirety.

FIELD

The present disclosure relates to wireless networks, and more particularly to wireless networks with simultaneous uplink transmission of independent data from multiple wireless client stations to an access point.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

When operating in an infrastructure mode, Wireless Local Area Networks (WLANs) typically include an access point (AP) and one or more client stations. Development of WLAN standards such as IEEE §§802.11a/b/g/n has focused primarily on improving single-user peak data throughput. For example, IEEE §802.11b operate at a single-user peak throughput of 11 Mbps, IEEE §802.11a/g operates at a single-user peak throughput of 54 Mbps, and IEEE §802.11n operates at a single-user peak throughput of 600 Mbps.

In these WLANs, the AP transmits information to one client station at a time in a unicast mode. Alternatively, the same information may be transmitted to a group of client stations concurrently in a multicast mode. This approach reduces network efficiency because other client stations need to wait until the current client station or group of client stations is serviced. When transmitting the same information to the group of client stations, throughput may be limited by one of the client stations with the weakest reception.

For uplinks, the client stations typically contend for access to the medium. In other words, only one client station may transmit uplink data to the AP at a time. For example, the client stations may contend for the channel using Carrier Sense Multiple Access (CSMA). One client station may transmit when there are no other client stations transmitting. When a client station detects activity, the client station waits a random backoff period before retrying. This approach is inefficient for several reasons. Uplink transmission cannot be guaranteed to occur within a particular time frame. In addition, inefficiency tends to increase as the number of client stations increases.

SUMMARY

A wireless network comprises R client stations that respectively generate simultaneous uplink transmission (SUT) data, where R is an integer greater than one. An access point (AP) receives SUT data from each of the R client stations during an SUT period.

In other features, the R client stations transmit the SUT data synchronously to the AP during the SUT period. The AP adjusts a transmit power level of one or more of the R client stations based on corresponding transmit power levels received by the AP. D legacy client stations are not SUT enabled. The AP prevents the D client stations from transmitting during the SUT period. The R client stations transmit the SUT data asynchronously to the AP during the SUT period. Each of the R client stations transmits the SUT data to the AP during the SUT period using a different spreading-sequence code. Each of the R client stations transmits the SUT data to the AP during the SUT period using a different portion of bandwidth. Each of the R client stations transmit the SUT data to the AP at different times during the SUT period. The AP sequentially transmits acknowledgements to the R client stations in a non-overlapping manner during the SUT period.

A client station comprises a physical layer (PHY) module and a medium access control (MAC) module that communicates with the PHY module and that transmits simultaneous uplink transmission (SUT) data to an access point (AP) during a SUT period. Other client stations associated with the AP transmit other SUT data to the AP during the SUT period.

In other features, the client station transmits the SUT data synchronously with transmission of the other SUT data from the other client stations. A power level adjustment module adjusts a transmit power level of the client station based on data received from the AP. The client station transmits asynchronously with respect to the other client stations during the SUT period. The client station transmits during the SUT period using a different spreading-sequence code than the other client stations. The client station transmits during the SUT period using a different portion of bandwidth than the other client stations. The client station transmits at different times than the other client stations during the SUT period.

A client station comprises physical layer (PHY) means for providing an interface to a medium and medium access control (MAC) means for communicating with the PHY means and for transmitting simultaneous uplink transmission (SUT) data to an access point (AP) during a SUT period. Other client stations associated with the AP transmit other SUT data to the AP during the SUT period.

In other features, the client station transmits the SUT data synchronously with transmission of the other SUT data from the other client stations. Power level adjustment means adjusts a transmit power level of the client station based on data received from the AP. The client station transmits asynchronously with respect to the other client stations during the SUT period. The client station transmits during the SUT period using a different spreading-sequence code than the other client stations. The client station transmits during the SUT period using a different portion of bandwidth than the other client stations. The client station transmits at different times than the other client stations during the SUT period.

A method for operating a wireless network comprises generating simultaneous uplink transmission (SUT) data using R client stations, where R is an integer greater than one and receiving SUT data from each of the R client stations at an access point (AP) during an SUT period.

In other features, the method includes transmitting the SUT data synchronously to the AP during the SUT period. The AP adjusts a transmit power level of one or more of the R client stations based on corresponding transmit power levels received by the AP. D legacy client stations are not SUT enabled. The method includes preventing the D client stations from transmitting during the SUT period. The method includes transmitting the SUT data asynchronously to the AP during the SUT period. The method includes transmitting the SUT data to the AP during the SUT period using a different spreading-sequence code. The method includes transmitting the SUT data to the AP during the SUT period using a different portion of bandwidth. The method includes transmitting the SUT data to the AP at different times during the SUT period. The method includes sequentially transmitting acknowledgements to the R client stations in a non-overlapping manner during the SUT period.

An access point comprises a physical layer module. W signal processing modules communicate with the physical layer module and receive simultaneous uplink transmission (SUT) data from R client stations during an SUT period, where W and R are integers greater than one.

In other features, the R client stations transmit the SUT data to the access point synchronously. The access point adjusts a power level of the R client stations. The access point associates with D legacy client stations that are not SUT enabled, wherein D is an integer greater than zero. The access point prevents the D legacy client stations from transmitting during the SUT period. The R client stations transmit asynchronously during the SUT period. Each of the R client stations transmit to the access point during the SUT period using a different spreading-sequence code. Each of the R client stations transmit to the access point during the SUT period using a different portion of bandwidth. Each of the R client stations transmit to the access point at different times during the SUT period. The access point sequentially transmits acknowledgements to the R client stations in a non-overlapping manner.

A method for operating an access point comprises providing W signal processing modules; and receiving simultaneous uplink transmission (SUT) data from R client stations during an SUT period, where W and R are integers greater than one.

In other features, the method includes transmitting the SUT data to the access point synchronously. The method includes adjusting a power level of the R client stations. The method includes associating with D legacy client stations that are not SUT enabled, wherein D is an integer greater than zero. The method includes preventing the D legacy client stations from transmitting during the SUT period.

In other features, the R client stations transmit asynchronously during the SUT period. Each of the R client stations transmit to the access point during the SUT period using a different spreading-sequence code. Each of the R client stations transmit to the access point during the SUT period using a different portion of bandwidth. Each of the R client stations transmit to the access point at different times during the SUT period. The method includes sequentially transmitting acknowledgements to the R client stations in a non-overlapping manner.

An access point comprises physical layer means for providing an interface to a medium. W signal processing means communicate with the physical layer means and receive simultaneous uplink transmission (SUT) data from R client stations during an SUT period, where W and R are integers greater than one.

In other features, the R client stations transmit the SUT data to the access point synchronously. The access point adjusts a power level of the R client stations. The access point associates with D legacy client stations that are not SUT enabled, wherein D is an integer greater than zero. The access point prevents the D legacy client stations from transmitting during the SUT period. The R client stations transmit asynchronously during the SUT period. Each of the R client stations transmit to the access point during the SUT period using a different spreading-sequence code. Each of the R client stations transmit to the access point during the SUT period using a different portion of bandwidth. Each of the R client stations transmit to the access point at different times during the SUT period. The access point sequentially transmits acknowledgements to the R client stations in a non-overlapping manner.

In still other features, the systems and methods described above are implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description, the claims and the drawings. It should be understood that the detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 2 is a timing diagram illustrating legacy windows and a simultaneous uplink transmission (SUT) window;

FIG. 3 is a timing diagram illustrating an uplink SUT packet and acknowledgments;

DESCRIPTION

Figure 1:
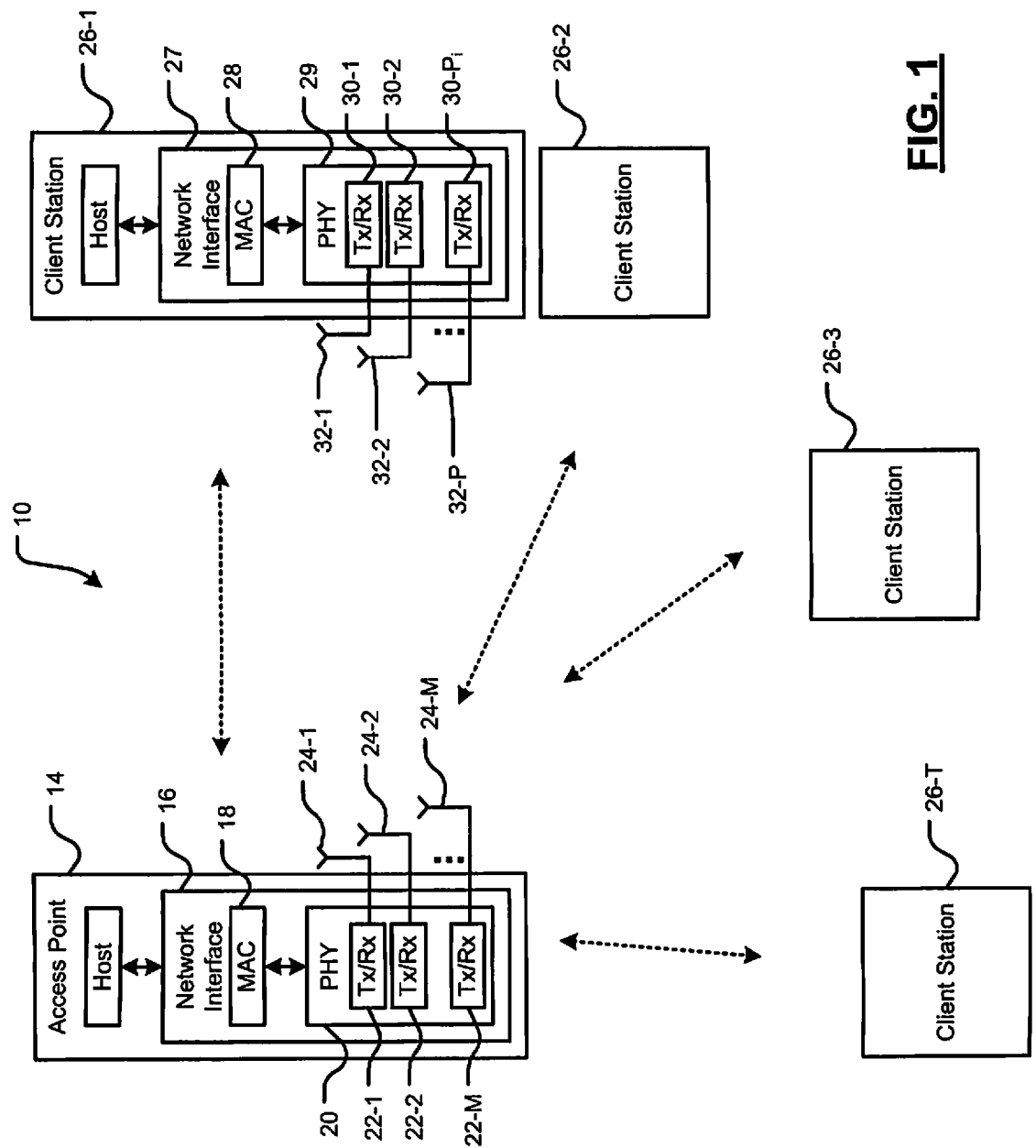
FIG. 1 is a functional black diagram of a WLAN including an access point (AP) and one or more client stations.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory (shared, dedicated, or group) that execute one or more software or firmware programs, a combinational logic circuit, and/or other suitable components that provide the described functionality.

According to the present disclosure, multiple client stations transmit uplink data to an access point (AP) at the same time (hereinafter simultaneous uplink transmission (SUT)). To accomplish this, the AP includes multiple antennas and the client stations may include one or more antennas.

When two or more of the client stations simultaneously transmit data to the AP, transmissions may be synchronous or asynchronous. Timing of synchronous transmission may be controlled by the AP. Alternatively, transmissions may be asynchronous within an SUT period. This approach translates into an increased number of client stations serviced by a single AP. This, in turn, provides significant economic and end-user advantages. For example only, this approach may be used in conjunction with Orthogonal Frequency Division Multiplexing (OFDM) or with other suitable modulation schemes.

During an SUT period, the AP receives a superposition of transmitted signals from SUT-enabled client stations. For synchronous uplink OFDM transmission, the AP uses multiple antennas to separate and detect the individual transmitted signals from each SUT-enabled client station reliably. Increasing the number of antennas at the AP may tend to increase the number of SUT-enabled client stations that can simultaneously be detected.

For asynchronous uplink transmission, additional signal separation may be required. When asynchronous uplink transmission is used, the AP may assign each of the SUT-enabled client stations one or more of the following: a spreading-sequence (i.e., code) to each user; different portions of bandwidth to transmit; and/or different portions of time within the SUT period for transmission.

When the SUT-enabled client stations transmit simultaneously within a given SUT period, receive power for the client stations that are located close to the AP may be higher than other client stations located further from the AP. Without power adjustment, variations in power levels may tend to degrade reception quality for client stations that are farther away. According to the present disclosure, in one implementation, the AP and client stations use power control to improve uniformity of reception quality across client stations.

Implementing SUT-enabled APs and clients stations requires appropriate modifications to the APs and the client stations. The APs and client stations may still be compatible with IEEE §§802.11n/a/b/g to allow communications with legacy client stations. SUT transmissions (e.g., SUT frames) may have a format compatible with those associated with legacy client stations to allow the legacy client stations to detect SUT frames.

The AP may also designate a protected SUT period during which SUT transmissions are conducted between SUT-enabled client stations and the AP. During the SUT period, other network devices are instructed to not transmit data. For example only, the SUT period may be designated by the AP using various Medium Access Control (MAC) mechanisms in current WLAN specifications. Acknowledgements (ACKS) may be transmitted during the SUT period by the AP to the SUT-enable client stations that are transmitting data.

As discussed above, the AP may adjust the transmit power levels of the client stations. The AP may send transmit power level data to the client stations associated with the AP, e.g., during association, network entry handshake, periodically, on an event basis or at other times.

Referring now to FIG. 1, an exemplary wireless local area network (WLAN) 10 is shown. The WLAN 10 includes an access point (AP) 14. The AP 14 includes a network interface 16 including a medium access control (MAC) module 18, a physical layer (PHY) module 20, M transceivers 22-1, 22-2, . . . , 22-M, and M antennas 24-1, 24-2, . . . , 24-M (collectively antennas 24), where M is an integer greater than one.

The WLAN 10 is associated with T client stations 26-1, 26-2, . . . , 26-T (collectively client stations 26), where T is an integer greater than one. R of the T client stations 26 are SUT enabled, and (T-R) of the T client stations 26 may be legacy client stations that are not SUT enabled, where R is an integer less than or equal to T.

Each of the T client stations 26 may include a network interface 27 including a MAC module 28, a PHY module 29, $P_i$ transceivers 30-1, 30-2, . . . , 30-$P_i$, and $P_i$ antennas 32-1, 32-2, . . . , 32-$P_i$, where $P_i$ is an integer greater than zero, and i corresponds to an $i^{th}$ one of the T client stations 26. Each f the T client stations 26 may have different numbers of transceivers and antennas.

Referring now to FIGS. 2 and 3, exemplary legacy windows and SUT windows are shown. The legacy client stations may transmit or receive data to/from the AP 14 during legacy windows 50, 52. For example, the legacy windows 50, 52 may be CSMA windows.

During an SUT window 54, multiple SUT enabled client stations (for example, client stations 26-1, 26-3, 26-4 in FIG. 2) send SUT data 60-1, 60-2, . . . , 60-B to the AP 14 during a first part of the SUT period. During a second part of the SUT period, the AP 14 sends acknowledgements to the SUT enabled client stations 26-1, 26-3, 26-4 at spaced intervals. During the SUT window 54, other network devices (e.g., legacy client stations) are unable to transmit data. Time sufficient for the SUT window 54 may be arranged with the legacy client stations using MAC mechanisms provided by existing WLAN specifications.

While staggered ACKs are shown, there are other ways of transmitting the ACKs to the SUT-enabled client stations. For example, instead of staggered ACKs, a single encoded ACK may be transmitted. The single encoded ACK may be decodable by SUT-enabled clients. For example only, the single encoded ACK message may include MAC addresses for each of the client stations whose messages were successfully received.

Alternately, the ACKs may be aggregated and specially encoded in one single aggregated packet (frame). Each subframe of the aggregated frame includes one ACK with similar content as the staggered ACKs.

Multiple ACKs may be simultaneously transmitted on the downlink using simultaneous downlink transmission (SDT). In other words, each ACK message may be multiplied by a different steering matrix W that is tailored for the channel between the AP and the respective client station. The multiple ACKs may be summed and transmitted by the AP. Additional details relating to SDT transmission from the AP may be found in U.S. patent application Ser. No. 12/175,526 filed on Jul. 18, 2008, which is hereby incorporated by reference in its entirety.

In FIG. 3, the uplink SUT data 60-1, 60-2, . . . 60-B may be followed by a period of acknowledgments (ACKs) 62-1, 62-2, . . . 62-X (collectively ACKs 62) sent by the AP 14 to SUT-enabled client stations 26 that sent data during the SUT window 54.

Figure 4:
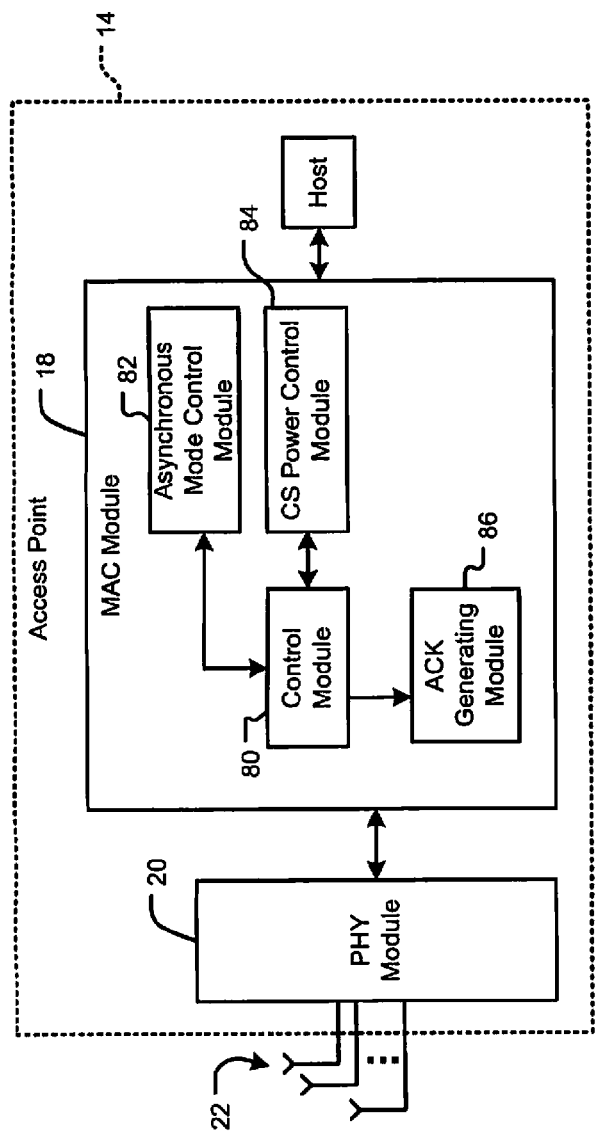
FIG. 4 is a functional block diagram of an exemplary AP.

Referring now to FIG. 4, an exemplary AP 14 is shown to include the MAC module 18 and the PHY module 20. The MAC module 18 includes a control module 80 that performs control-related operation of the MAC module 18. The control module 80 communicates with an asynchronous mode control module 82 that enables and disables asynchronous mode operation of the AP 14 and the client stations 26. The asynchronous mode control module 82 generates configuration data for configuring the SUT-enabled client stations and causes the configuration data to be sent to the SUT-enabled client stations. When the asynchronous mode is enabled by the AP, the asynchronous mode control module 82 may selectively assign the SUT-enabled client stations one or more of the following: a spreading-sequence (i.e., code) to each user; different portions of bandwidth to transmit; and/or different portions of time within the SUT period for transmission. The asynchronous mode control module 82 also enables the AP 14 to receive asynchronous signals from multiple client stations. Alternately, the SUT-enabled client stations may be preconfigured or configured from the client side. In this case, the SUT-enabled client stations may send configuration data to the AP 14.

The control module 80 also communicates with a client station (CS) power control module 84 that coordinates transmit power levels of the SUT-enabled client stations. In other words, the CS power control module 84 measures receive power levels of each of the SUT-enabled client stations and selectively adjusts one or more of transmit power levels for the SUT-enabled client stations. In other words, the AP 14 may adjust the power levels such that each SUT-enabled client station has approximately the same receive power levels at the AP 14.

The control module 80 also communicates with an acknowledgement (ACK) generating module 86. The ACK generating module 86 generates ACKs at spaced time intervals during the SUT period for each of the SUT-enabled client stations that send SUT data.

Figure 5:
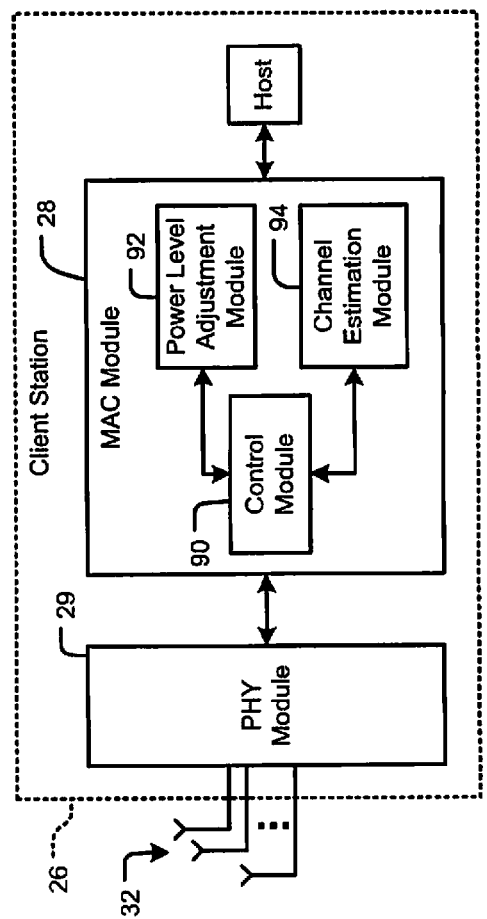
FIG. 5 is a functional block diagram of an exemplary client station.

Referring now to FIG. 5, an exemplary client station is shown to include the MAC module 28 and the PHY module 29. The MAC module 28 includes a control module 90 that performs control-related operation of the MAC module 28. The control module 90 communicates with a power level adjustment module 92, which may be implemented in the MAC module 28 or the PHY module 29. The power level adjustment module 92 receives transmit power data from the AP 14 and sets a transmit power level of the client station accordingly.

The control module 90 also communicates with an asynchronous mode configuration module 94 that configures the client station to operate in an asynchronous mode. For example, the asynchronous mode configuration module 94 selectively configures the client station to use one or more of the following: a predetermined spreading-sequence (i.e., code); a predetermined portion of bandwidth to transmit; and/or a predetermined portion of time within the SUT period for transmission.

Figure 6A:
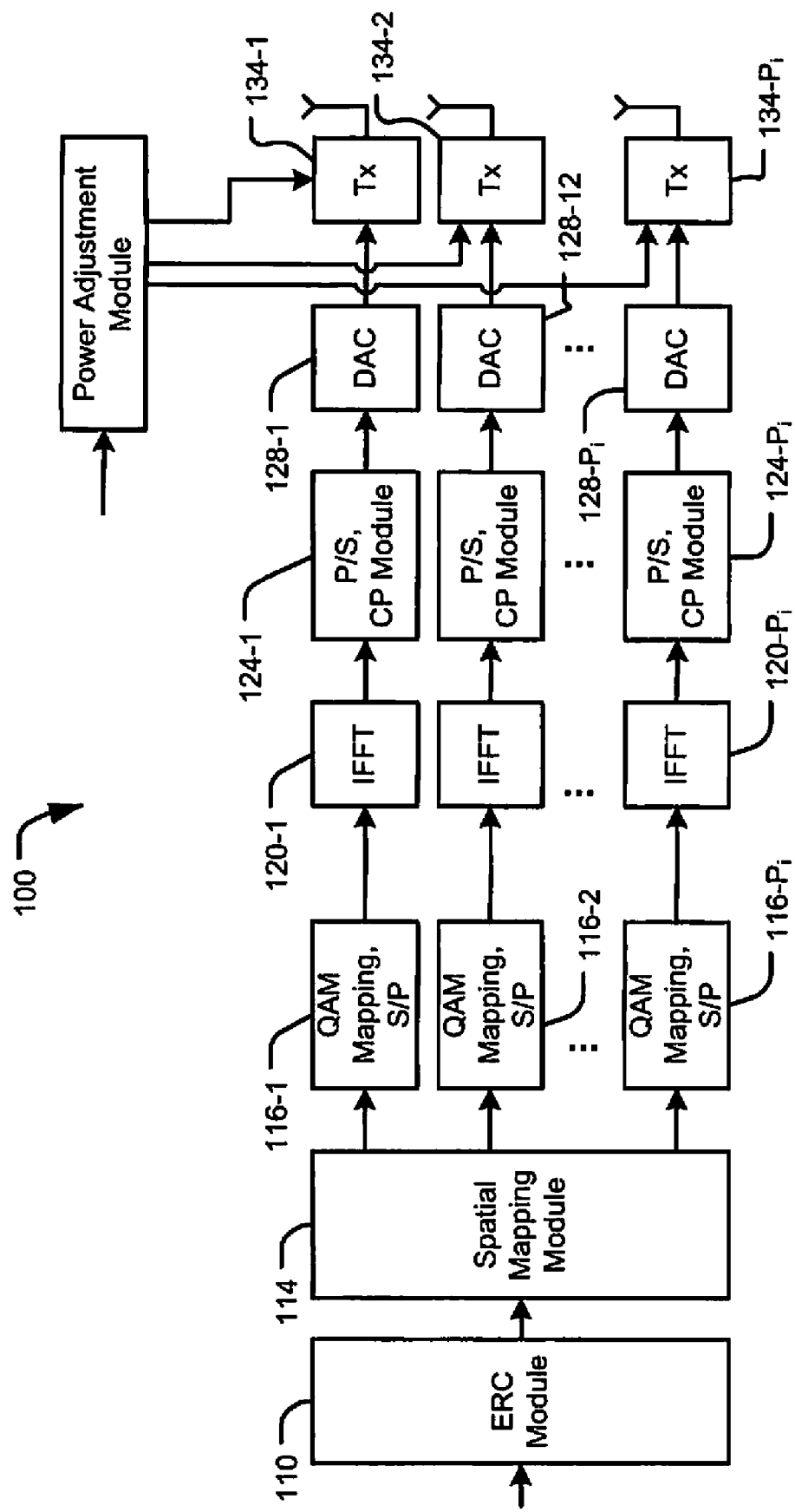
FIG. 6A is a functional block diagram of an exemplary transmit path of an exemplary client station.
Figure 6B:
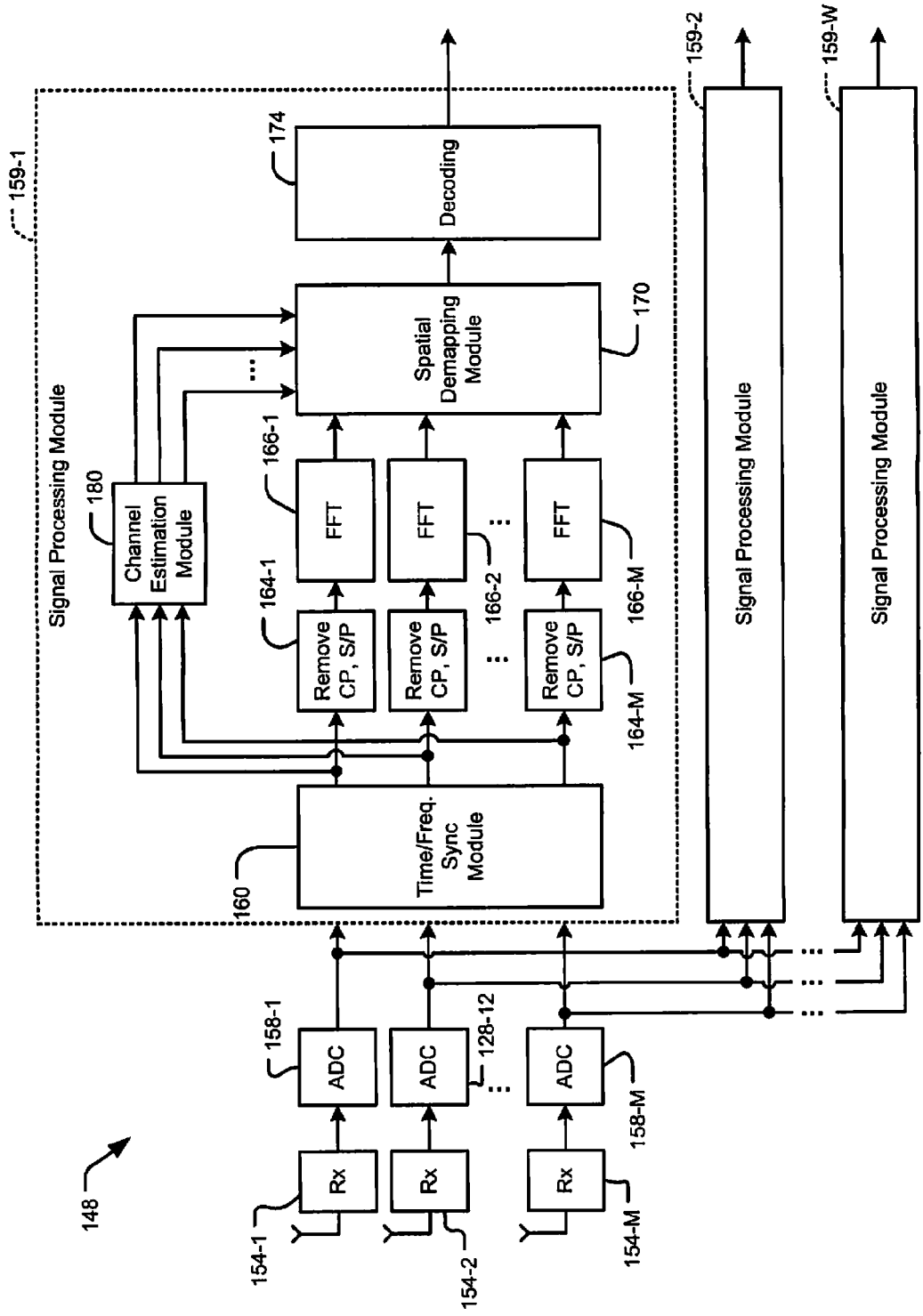
FIG. 6B is a functional block diagram of an exemplary receive path of an exemplary AP.

Referring now to FIGS. 6A and 6B, exemplary transmit and receive paths for the client stations and AP are shown, respectively. Skilled artisans will appreciate that there are a number of different ways to implement the foregoing wireless network in addition to those described herein and that the foregoing are merely examples. In FIG. 6A, an exemplary transmit path 100 of the client station is shown. The transmit path 100 includes encoder module 110 that receives a bit stream. The encoder module 110 outputs an encoded bit stream to a spatial mapping module 114, which performs spatial mapping.

Outputs of the spatial mapping module 114 are input to quadrature amplitude modulation (QAM) mapping modules 116-1, 116-2, . . . , and 116-$P_i$ (collectively QAM mapping modules 118), which perform QAM and serial-to-parallel (S/P) conversion. The QAM mapping modules 116 output OFDM tones that are input to inverse Fast Fourier Transform (IFFT) modules 120-1, 120-2, . . . , 120-$P_i$ (collectively IFFT modules 120). Outputs of the IFFT modules 120 are input to a parallel-to-serial (P/S) converter and cyclic prefix modules 124-11, 124-12, . . . , 124-$P_i$ (collectively P/S and CP modules 124). Outputs of the P/S and CP modules 124 are input to digital-to-analog converters (DACs) 128-1, 128-2, . . . , and 128-$P_i$ (collectively DACs 128) and then to transmitters 134-1, 134-2, . . . , and 134-$P_i$ and associated $P_i$ antennas.

In FIG. 6B, a receive path 148 comprises receivers 154-1, 154-2, . . . 154-M (collectively receivers 154) that communicate with analog to digital converters (ADCs) 158-1, 158-2, . . . , and 158-M (collectively ADCs 158). Outputs of the ADCs 158 are input to signal processing modules 159-1, 159-2, . . . , and 159-W (collectively signal processing modules 159). Other signal processing modules 159-2, . . . , and 159-W are configured for other client stations. The signal processing modules 159 may be configured by the MAC module to recover signals from one of the client stations.

The signal processor 159-1 includes a time/frequency synchronization module 160, which estimates and corrects for frequency offset and retrieves symbol timing for one of the client stations. Outputs of the time/frequency synchronization module 160 are input to cyclic prefix (CP) and serial to parallel (SIP) converting modules 164-1, 164-2, . . . , and 164-M (collectively CP and S/P modules 164). Outputs of the CP and S/P modules 164 are input to Fast Fourier Transform modules 166-1, 166-2, . . . , and 166-M (collectively FFT 166), which perform FFT. Outputs of the FFT modules 166 are input to a spatial demapping module 170, which performs spatial demapping. Outputs of the spatial demapping module 170 are input to a decoder 174.

Figure 7A:
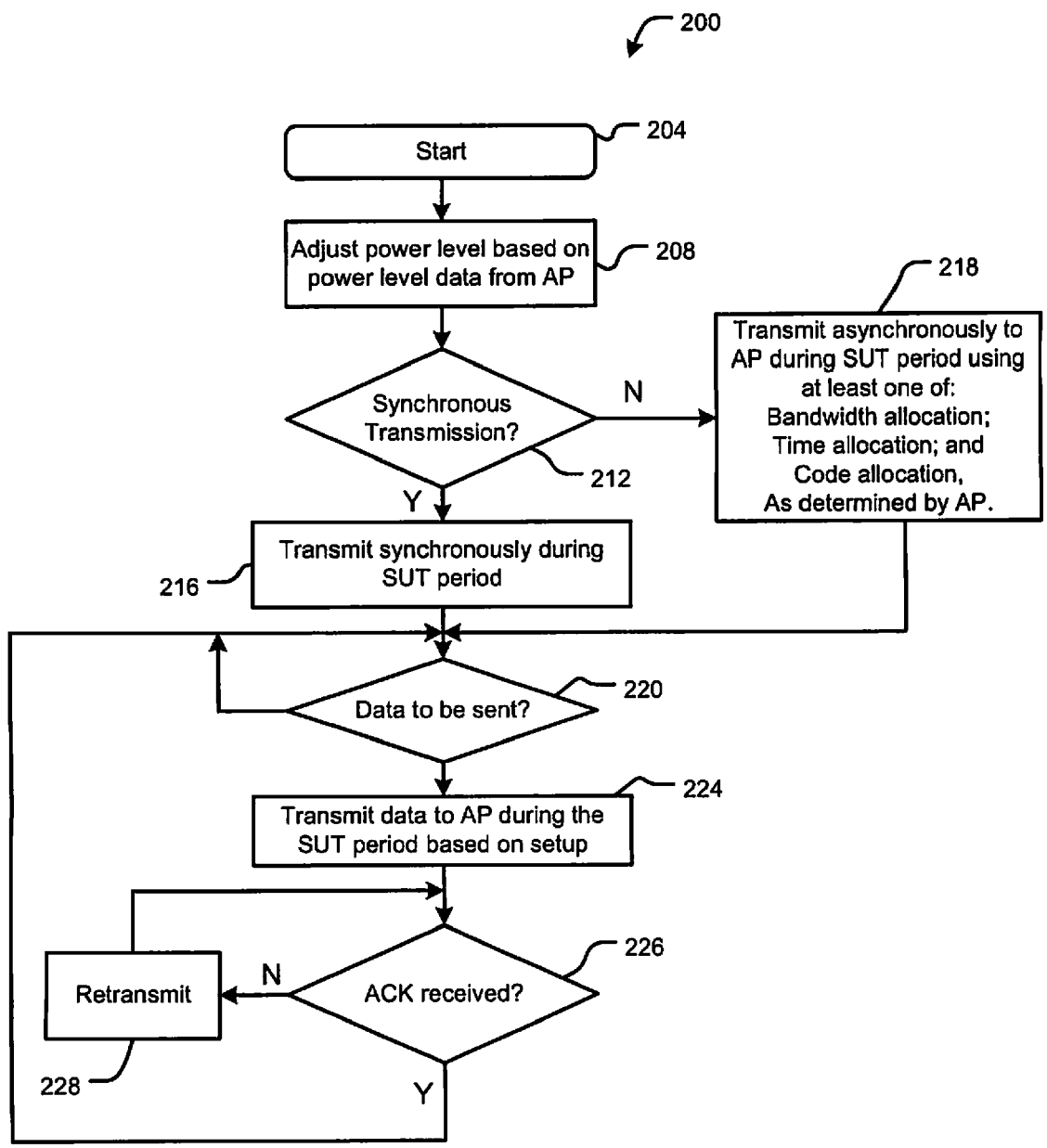
FIG. 7A illustrates an exemplary method for operating an exemplary client station.

Referring now to FIG. 7A, a method 200 for operating a client station (e.g., the client station of FIG. 5) is shown. Control begins with step 204. In step 208, control adjusts a transmit power level based on data from the AP. The power level can be adjusted initially when the client station associates with the AP, at periodic intervals and/or when certain events occur. In FIG. 7A, power is adjusted initially.

For example, the power level may be checked at periodic intervals. If the power level remains about the same (e.g., within a predetermined range of an initial value), the time interval for checking the power level can be increased. This situation may correspond to a client station that is not moving very frequently such as a desktop computer. Conversely, if the power level varies more, the time interval for checking the power level can be reduced. This situation may correspond to a client station that is moving, such as a laptop that is moved. Event-based power level adjustment may also be performed.

In step 212, the client station determines whether synchronous transmission is enabled. If step 212 is true, the (SUT-enabled) client station transmits synchronously during an SUT period based on timing data from the AP. Otherwise, the client station transmits asynchronously to the AP during the SUT period using at least one of bandwidth allocation, time allocation and/or code allocation. The client station may be set up by the AP, by the user, or preset.

Control determines whether there is data that is ready to be sent by the client station to the AP in step 220. If step 220 is true, control sends the data based on the setup described above in step 224. After sending data, the client station determines whether an ACK is received in step 226. If step 226 is true, control returns to step 220. If step 226 is false, the client station may retransmit in step 228 and then control returns to step 226.

Figure 7B:
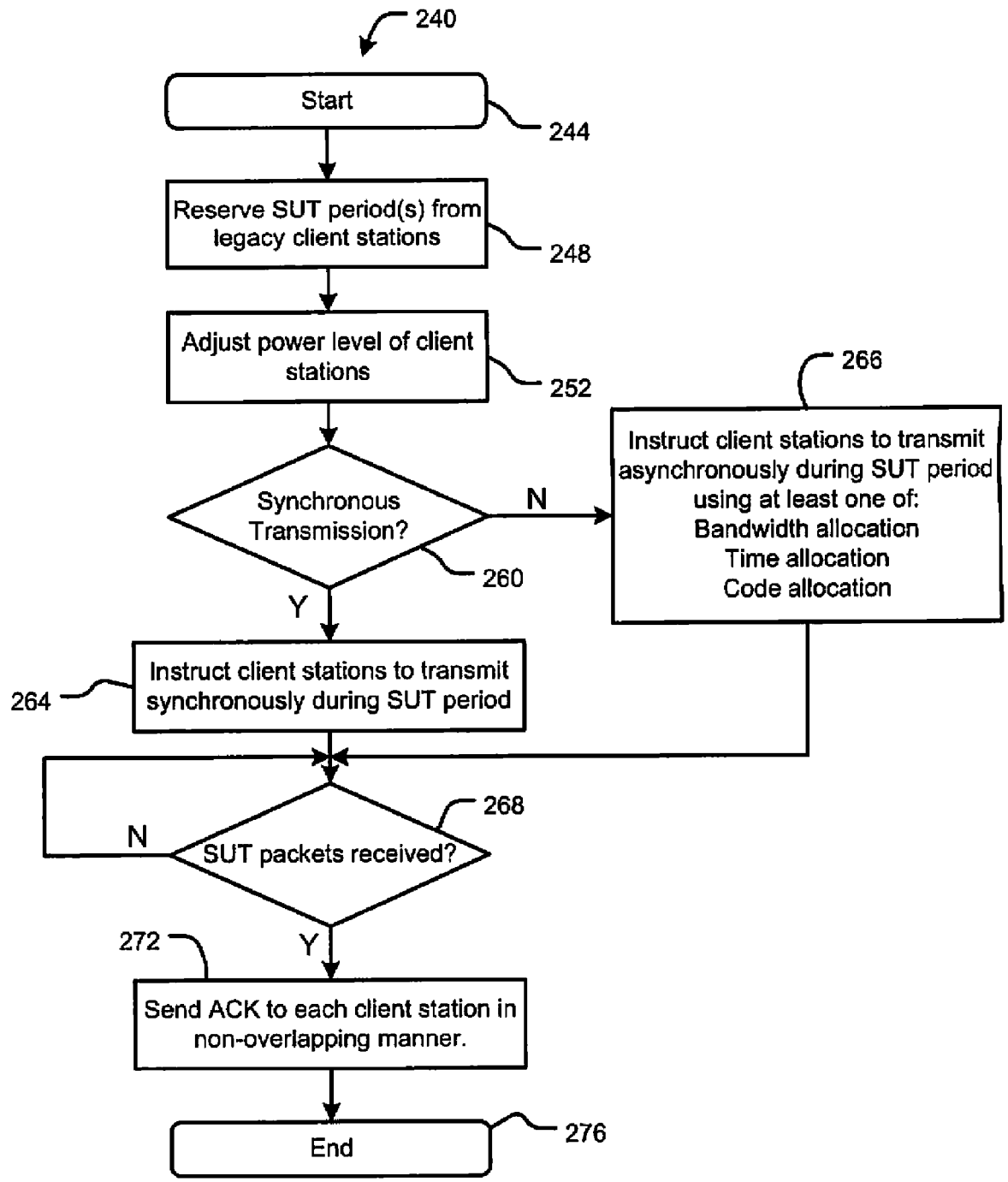
FIG. 7B illustrates an exemplary method for operating an exemplary AP.

Referring now to FIG. 7B, a method 240 for operating an AP (e.g, AP 14) is shown in further detail. Control begins with step 244. In step 248, the AP reserves SUT periods from legacy client stations as needed. In step 252, the AP adjusts the power levels of the client stations relative to each other based on corresponding receive power levels. In step 260, the AP determines whether synchronous transmission will be used. If step 260 is true, the AP instructs SUT-enabled client stations to transmit synchronously during the SUT period.

Alternately, if asynchronous transmission will be used, the AP instructs the SUT-enabled client stations to transmit asynchronously during the SUT period using at least one of bandwidth allocation, time allocation and code allocation in step 266. In step 268, control determines whether SUT data is received during the SUT period. If step 268 is true, the AP sends an ACK to the SUT-enabled client stations in step 272 as described above. Control ends in step 276.

The present disclosure uses several concepts to improve uplink transmission efficiency. According to the present disclosure, multiple client stations may transmit simultaneously to the AP. The client stations can transmit either synchronously or asynchronously. When asynchronous transmission is used, the client stations and AP increase the ability to separate signals through the use of bandwidth allocation, time allocation, and/or code allocation. In one implementation, the present disclosure also employs power control across client stations in conjunction with SUT to ensure a minimum quality of reception across client stations. In addition, in one implementation, the present disclosure employs a protected SUT period during which legacy client stations are blocked from transmitting.

Referring now to FIGS. 8A-8E, various exemplary implementations incorporating the teachings of the present disclosure are shown. The SUT-enabled network interfaces of the AP or the client stations described above can be integrated with other devices. Some exemplary devices are set forth below.

Figure 8B:
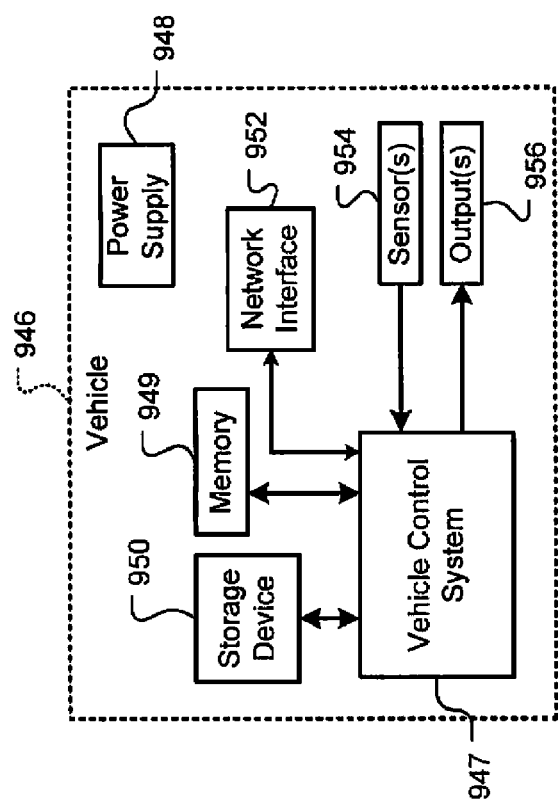
FIG. 8B is a functional block diagram of a vehicle control system.
Figure 8A:
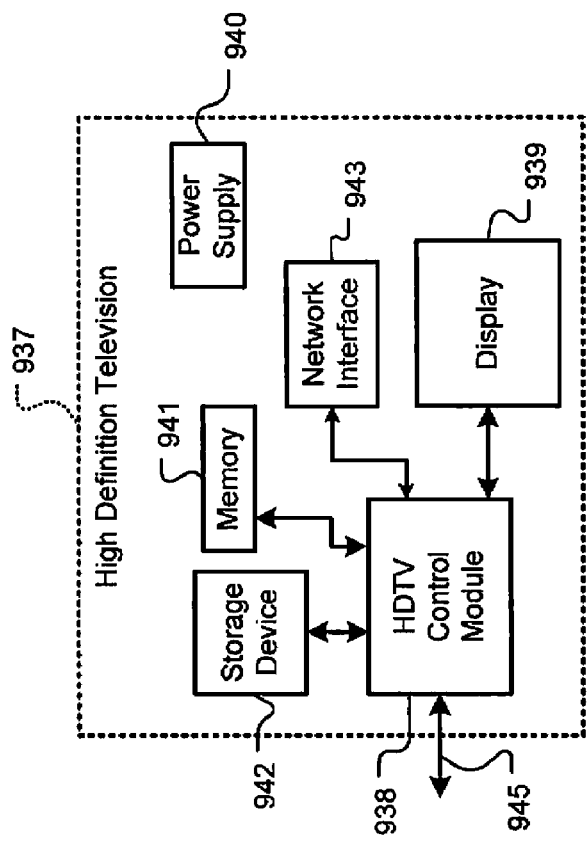
FIG. 8A is a functional block diagram of a high definition television.

Referring now to FIG. 8A, the teachings of the disclosure can be implemented in a wireless network interface of a high definition television (HDTV) 937. The HDTV 937 includes an HDTV control module 938, a display 939, a power supply 940, memory 941, a storage device 942, a network interface 943, and an external interface 945. If the network interface 943 includes a wireless local area network interface, an antenna (not shown) may be included.

The HDTV 937 can receive input signals from the network interface 943 and/or the external interface 945, which can send and receive data via cable, broadband Internet, and/or satellite. The HDTV control module 938 may process the input signals, including encoding, decoding, filtering, and/or formatting, and generate output signals. The output signals may be communicated to one or more of the display 939, memory 941, the storage device 942, the network interface 943, and the external interface 945.

Memory 941 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 942 may include an optical storage drive, such as a DVD drive, and/or a hard disk drive (HDD). The HDTV control module 938 communicates externally via the network interface 943 and/or the external interface 945. The power supply 940 provides power to the components of the HDTV 937.

Referring now to FIG. 8B, the teachings of the disclosure may be implemented in a wireless network interface of a vehicle 946. The vehicle 946 may include a vehicle control system 947, a power supply 948, memory 949, a storage device 950, and a network interface 952. If the network interface 952 includes a wireless local area network interface, an antenna (not shown) may be included. The vehicle control system 947 may be a powertrain control system, a body control system, an entertainment control system, an anti-lock braking system (ABS), a navigation system, a telematics system, a lane departure system, an adaptive cruise control system, etc.

The vehicle control system 947 may communicate with one or more sensors 954 and generate one or more output signals 956. The sensors 954 may include temperature sensors, acceleration sensors, pressure sensors, rotational sensors, airflow sensors, etc. The output signals 956 may control engine operating parameters, transmission operating parameters, suspension parameters, brake parameters, etc.

The power supply 948 provides power to the components of the vehicle 946. The vehicle control system 947 may store data in memory 949 and/or the storage device 950. Memory 949 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 950 may include an optical storage drive, such as a DVD drive, and/or a hard disk drive (HDD). The vehicle control system 947 may communicate externally using the network interface 952.

Figure 8D:
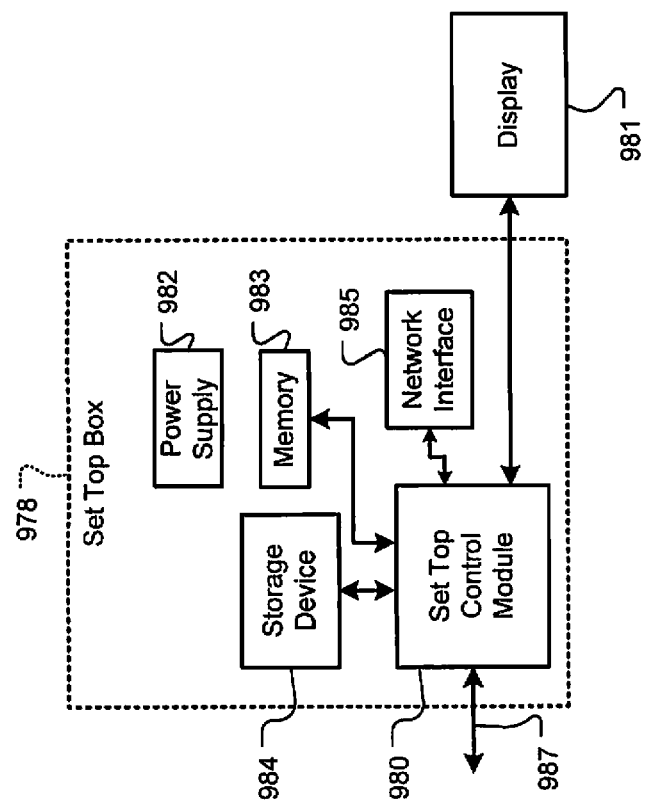
FIG. 8D is a functional block diagram of a set top box.
Figure 8C:
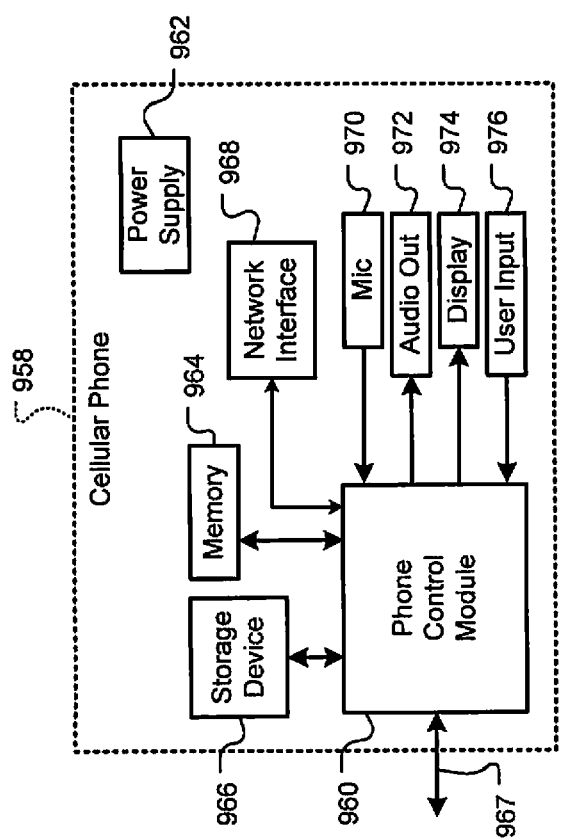
FIG. 8C is a functional block diagram of a cellular phone.

Referring now to FIG. 8C, the teachings of the disclosure can be implemented in a wireless network interface of a cellular phone 958. The cellular phone 958 includes a phone control module 960, a power supply 962, memory 964, a storage device 966, and a cellular network interface 967. The cellular phone 958 may include a network interface 968, a microphone 970, an audio output 972 such as a speaker and/or output jack, a display 974, and a user input device 976 such as a keypad and/or pointing device. If the network interface 968 includes a wireless local area network interface, an antenna (not shown) may be included.

The phone control module 960 may receive input signals from the cellular network interface 967, the network interface 968, the microphone 970, and/or the user input device 976. The phone control module 960 may process signals, including encoding, decoding, filtering, and/or formatting, and generate output signals. The output signals may be communicated to one or more of memory 964, the storage device 966, the cellular network interface 967, the network interface 968, and the audio output 972.

Memory 964 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 966 may include an optical storage drive, such as a DVD drive, and/or a hard disk drive (HDD). The power supply 962 provides power to the components of the cellular phone 958.

Referring now to FIG. 8D, the teachings of the disclosure can be implemented in a wireless network interface of a set top box 978. The set top box 978 includes a set top control module 980, a display 981, a power supply 982, memory 983, a storage device 984, and a network interface 985. If the network interface 985 includes a wireless local area network interface, an antenna (not shown) may be included.

The set top control module 980 may receive input signals from the network interface 985 and an external interface 987, which can send and receive data via cable, broadband Internet, and/or satellite. The set top control module 980 may process signals, including encoding, decoding, filtering, and/or formatting, and generate output signals. The output signals may include audio and/or video signals in standard and/or high definition formats. The output signals may be communicated to the network interface 985 and/or to the display 981. The display 981 may include a television, a projector, and/or a monitor.

The power supply 982 provides power to the components of the set top box 978. Memory 983 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 984 may include an optical storage drive, such as a DVD drive, and/or a hard disk drive (HDD).

Figure 8E:
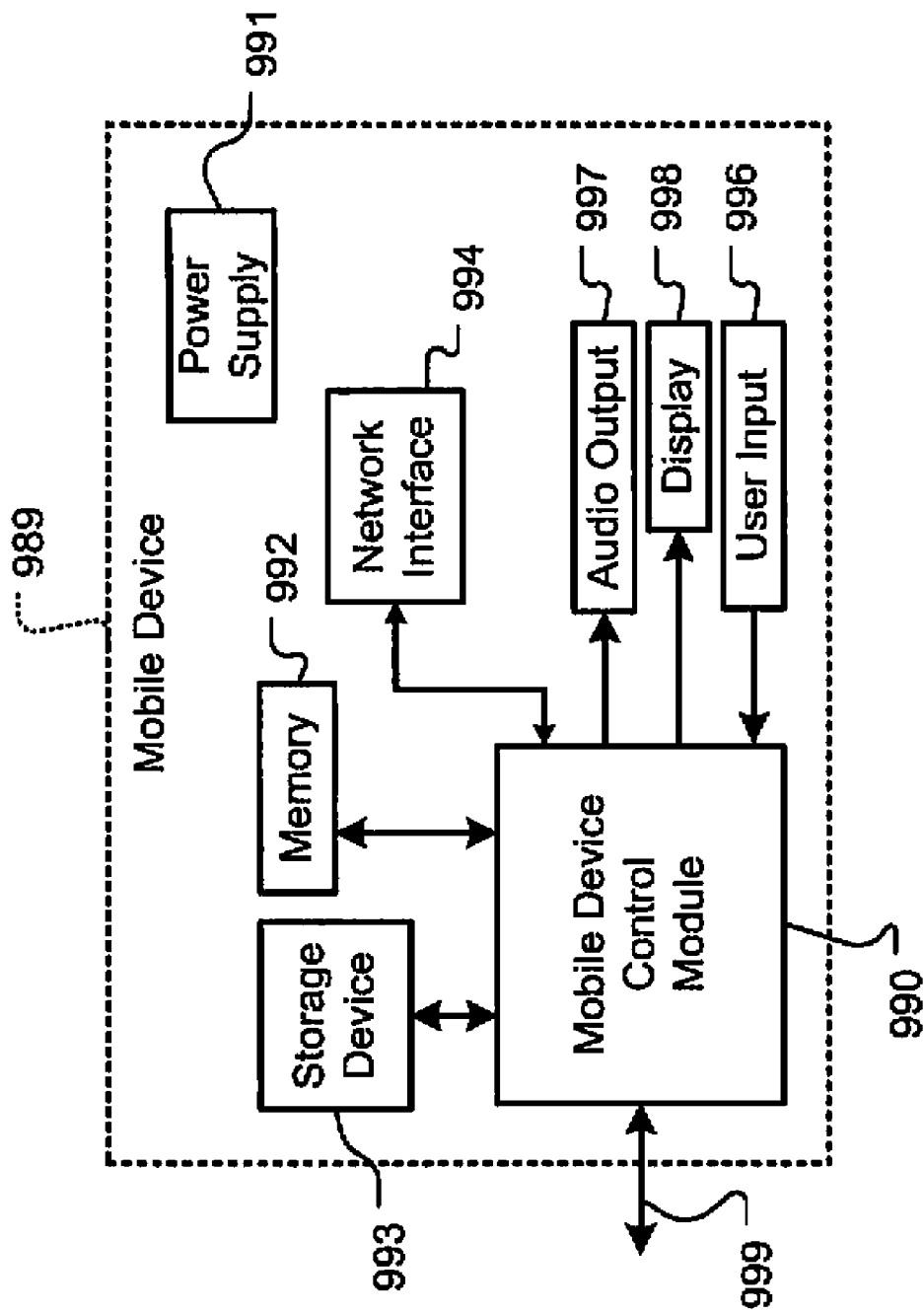
FIG. 8E is a functional block diagram of a mobile device.

Referring now to FIG. 8E, the teachings of the disclosure can be implemented in a wireless network interface of a mobile device 989. The mobile device 989 may include a mobile device control module 990, a power supply 991, memory 992, a storage device 993, a network interface 994, and an external interface 999. If the network interface 994 includes a wireless local area network interface, an antenna (not shown) may be included.

The mobile device control module 990 may receive input signals from the network interface 994 and/or the external interface 999. The external interface 999 may include USB, infrared, and/or Ethernet. The input signals may include compressed audio and/or video, and may be compliant with the MP3 format. Additionally, the mobile device control module 990 may receive input from a user input 996 such as a keypad, touchpad, or individual buttons. The mobile device control module 990 may process input signals, including encoding, decoding, filtering, and/or formatting, and generate output signals.

The mobile device control module 990 may output audio signals to an audio output 997 and video signals to a display 998. The audio output 997 may include a speaker and/or an output jack. The display 998 may present a graphical user interface, which may include menus, icons, etc. The power supply 991 provides power to the components of the mobile device 989. Memory 992 may include random access memory (RAM) and/or nonvolatile memory.

Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 993 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A wireless network comprising:
a plurality of client stations configured to respectively generate uplink user data, wherein the plurality of client stations include (i) a first set of client stations configured to transmit the uplink user data during a simultaneous uplink transmission period without sensing channel prior to transmitting the uplink user data, and (ii) a second set of client stations configured to transmit the uplink user data by sensing channel prior to transmitting the uplink user data; and
an access point configured to
service the plurality of client stations including the first set of client stations and the second set of client stations,
instruct the second set of client stations to not transmit the uplink user data during the simultaneous uplink transmission period, and
receive the uplink user data transmitted from two or more of the first set of client stations during the simultaneous uplink transmission period,
wherein the access point is configured to sequentially transmit a respective acknowledgement to the two or more of the first set of client stations in a non-overlapping manner during the simultaneous uplink transmission period.

2. The wireless network of claim 1, wherein the two or more of the first set of client stations transmit the uplink user data synchronously to the access point during the simultaneous uplink transmission period.

3. The wireless network of claim 1, wherein the access point is configured to adjust a transmit power level of the two or more of the first set of client stations based on corresponding transmit power levels received by the access point.

4. The wireless network of claim 1, wherein the two or more of the first set of client stations are configured to transmit the uplink user data asynchronously to the access point during the simultaneous uplink transmission period.

5. The wireless network of claim 4, wherein the two or more of the first set of client stations are configured to transmit the uplink user data to the access point during the simultaneous uplink transmission period using a different spreading-sequence code or using a different portion of bandwidth.

6. The wireless network of claim 4, wherein the two or more of the first set of client stations are configured to transmit the uplink user data to the access point during the simultaneous uplink transmission period using a different portion of bandwidth.

7. The wireless network of claim 4, wherein the two or more of the first set of client stations are configured to transmit the uplink user data to the access point at different times during the simultaneous uplink transmission period.

8. The wireless network of claim 1, wherein the respective acknowledgement transmitted to the two or more of the first set of client stations indicates whether the access point received the uplink user data from a respective one of the two or more of the first set of client stations.

9. The wireless network of claim 1, wherein prior to transmitting the respective acknowledgement to the two or more of the first set of client stations, the access point is configured to multiply the respective acknowledgement by a steering matrix corresponding to the channel between the access point and a respective one of the two or more of the first set of client stations.

10. A client station comprising:
a physical layer module; and
a medium access control module configured to communicate with the physical layer module and to transmit uplink user data to an access point during a simultaneous uplink transmission period,
wherein the access point is configured to
service (i) a first set of client stations, including the client station, configured to transmit uplink user data during the simultaneous uplink transmission period without sensing channel prior to transmitting the uplink user data, and (ii) a second set of client stations configured to transmit uplink user data by sensing channel prior to transmitting the uplink user data,
instruct the second set of client stations to not transmit the uplink user data during the simultaneous uplink transmission period, and
sequentially transmit acknowledgements to the client stations in the first set of client stations in a non-overlapping manner during the simultaneous uplink transmission period.

11. The client station of claim 10, wherein the client station is configured to transmit the uplink user data synchronously with transmission of the uplink user data from other client stations in the first set of client stations.

12. The client station of claim 10, further comprising a power level adjustment module configured to adjust a transmit power level of the client station based on data received from the access point.

13. The client station of claim 10, wherein the client station is configured to transmit the uplink user data asynchronously with respect to other client stations in the first set of client stations during the simultaneous uplink transmission period.

14. The client station of claim 13, wherein the client station is configured to transmit the uplink user data during the simultaneous uplink transmission period using a different spreading-sequence code than the other client stations or using a different portion of bandwidth than the other client stations.

15. The client station of claim 13, wherein the client station is configured to transmit the uplink user data during the simultaneous uplink transmission period using a different portion of bandwidth than the other client stations.

16. The client station of claim 13, wherein the client station is configured to transmit the uplink user data at different times than the other client stations during the simultaneous uplink transmission period.

17. A method for operating a wireless network, the method comprising:
generating uplink user data using a plurality of client stations, wherein the plurality of client stations include (i) a first set of client stations configured to transmit the uplink user data during a simultaneous uplink transmission period without sensing channel prior to transmitting the uplink user data, and (ii) a second set of client stations configured to transmit the uplink user data by sensing channel prior to transmitting the uplink user data;
receiving uplink user data from two or more of the first set of client stations at an access point during the simultaneous uplink transmission period, wherein, the access point is configured to
service the plurality of client stations including the first set of client stations and the second set of client stations, and
instruct the second set of client stations to not transmit the uplink user data during the simultaneous uplink transmission period; and
sequentially transmitting acknowledgements to the two or more of the first set of client stations in a non-overlapping manner during the simultaneous uplink transmission period.

18. The method of claim 17, further comprising synchronously transmitting the uplink user data from the two or more of the first set of client stations to the access point during the simultaneous uplink transmission period.

19. The method of claim 17, further comprising adjusting a transmit power level of the two or more of the set of client stations based on corresponding transmit power levels received by the access point.

20. The method of claim 17, further comprising asynchronously transmitting the uplink user data from the two or more of the first set of client stations to the access point during the simultaneous uplink transmission period.

21. The method of claim 20, further comprising transmitting the uplink user data to the access point during the simultaneous uplink transmission period using a different spreading-sequence code.

22. The method of claim 20, further comprising transmitting the uplink user data to the access point during the simultaneous uplink transmission period using a different portion of bandwidth.

23. The method of claim 20, further comprising transmitting the uplink user data to the access point at different times during the simultaneous uplink transmission period.

24. A method for operating a client station, the method comprising:
transmitting uplink user data from the client station to an access point during a simultaneous uplink transmission period,
wherein the access point is configured to
service (i) a first set of client stations, including the client station, configured to transmit uplink user data during the simultaneous uplink transmission period without sensing channel prior to transmitting the uplink user data, and (ii) a second set of client stations configured to transmit uplink user data by sensing channel prior to transmitting the uplink user data, and
instruct the second set of client stations to not transmit the uplink user data during the simultaneous uplink transmission period; and
sequentially transmitting acknowledgements from the access point to the client stations in the first set of client stations in a non-overlapping manner during the simultaneous uplink transmission period.

25. The method of claim 24, further comprising transmitting the uplink user data synchronously with transmission of the uplink user data from other client stations in the first set of client stations.

26. The method of claim 24, further comprising adjusting a transmit power level of the client station based on data received from the access point.

27. The method of claim 24, further comprising transmitting the uplink user data asynchronously with respect to other client stations in the first set of client stations during the simultaneous uplink transmission period.

28. The method of claim 27, further comprising transmitting the uplink user data during the simultaneous uplink transmission period using a different spreading-sequence code than the other client stations.

29. The method of claim 27, further comprising transmitting the uplink user data during the simultaneous uplink transmission period using a different portion of bandwidth than the other client stations.

30. The method of claim 27, further comprising transmitting the uplink user data at different times than the other client stations during the simultaneous uplink transmission period.

* * * * *